United States Patent [19]

Raczkowski

[11] Patent Number: 5,246,752
[45] Date of Patent: Sep. 21, 1993

[54] METHOD AND APPARATUS FOR DRAWING THERMOPLASTIC TUBING

[75] Inventor: Jan Raczkowski, Glendale, N.Y.

[73] Assignee: Technicon Instruments Corporation

[21] Appl. No.: 659,460

[22] Filed: Feb. 21, 1991

Related U.S. Application Data

[60] Continuation of Ser. No. 367,385, Jun. 16, 1989, abandoned, which is a division of Ser. No. 137,066, Dec. 23, 1987, abandoned, which is a division of Ser. No. 897,385, Aug. 18, 1986, abandoned.

[51] Int. Cl.$^5$ .................. A61M 25/00; B29D 23/22; F16L 11/06
[52] U.S. Cl. .................. 428/35.7; 428/36.9; 428/421; 428/422; 604/280; 138/118
[58] Field of Search .................. 428/36.9, 35.7, 421, 428/422; 138/118; 604/280

[56] References Cited

U.S. PATENT DOCUMENTS

| | | | |
|---|---|---|---|
| 285,896 | 10/1883 | Holland | 264/209 |
| 2,194,313 | 3/1940 | Loomis | 425/392 |
| 2,661,499 | 12/1953 | James, Jr. et al. | 18/425 |
| 2,797,149 | 6/1957 | Skeggs | 23/230 |
| 2,934,788 | 5/1960 | Holt | 264/209 |
| 3,241,432 | 3/1966 | Skeggs | 88/14 |
| 3,525,243 | 8/1970 | Charablow | 72/39 |
| 3,595,045 | 7/1971 | Fuqua | 72/39 |
| 3,608,344 | 9/1971 | Schwan | 72/38 |
| 3,668,166 | 6/1972 | Ledebur | 72/274 |
| 3,668,288 | 6/1972 | Takahashi | 264/47 |
| 3,812,702 | 5/1974 | Benteler et al. | 72/283 |
| 3,821,349 | 6/1974 | Mozer | 264/209 |
| 3,856,905 | 12/1974 | Dawson | 264/89 |
| 3,932,264 | 1/1976 | Haruki et al. | 204/402 |
| 4,002,709 | 1/1977 | Mozer | 264/90 |
| 4,015,938 | 4/1977 | Jay | 23/230 R |
| 4,079,609 | 3/1978 | Hodgskiss | 72/6 |
| 4,157,235 | 6/1979 | Lagabe et al. | 264/167 |
| 4,303,442 | 12/1981 | Hara et al. | 72/243 |
| 4,378,904 | 4/1983 | Stiebritz et al. | 72/467 |
| 4,379,102 | 4/1983 | Kertscher | 264/40.7 |
| 4,425,289 | 1/1984 | Lee et al. | 264/40.1 |
| 4,444,702 | 4/1984 | Thomas et al. | 264/40 |
| 4,469,483 | 9/1984 | Becker et al. | 604/280 |
| 4,477,287 | 10/1984 | Kush et al. | 134/15 |
| 4,490,316 | 12/1984 | Satzler | 264/40.7 |
| 4,534,934 | 8/1985 | Cho | 419/6 |
| 4,706,670 | 11/1987 | Andersen et al. | 604/282 |

FOREIGN PATENT DOCUMENTS 2145964  4/1985  United Kingdom ............... 428/36.9

OTHER PUBLICATIONS

*Modern Plastics Encyclopedia*, 1984–1985, "Selecting Plastics for Elevated Temperature Performance".
*Modern Plastics Encyclopedia*, 1984–1985, "Designing for Rigidity and Strength Under Static Load".
*Kirk-Othmer Encyclopedia of Chemical Technology*, vol. 11, pp. 42–48.

*Primary Examiner*—Ellis P. Robinson
*Assistant Examiner*—Charles R. Nold
*Attorney, Agent, or Firm*—Scully, Scott, Murphy & Presser

[57] ABSTRACT

The specification discloses a new method and apparatus for treating extruded teflon (fluoropolymer) tubing to significantly improve its dimensional and optical characteristics. Diameter tolerance is ±0.0002, concentricity rises to 95%, and optical clarity rises to the theoretical transmittance of the material. The tubing is first cleaned, and then heated to a transition temperature above 150°C. to soften and further homogenize the tubing. The tubing is then drawn through a polished diamond die and then rapidly cooled. The cooled tubing may be further stabilized by an annealing step. Both a batch mode and a continuous mode of operation are disclosed.

2 Claims, 4 Drawing Sheets

METHOD AND APPARATUS FOR DRAWING THERMOPLASTIC TUBING

This application is a continuation of U.S. Ser. No. 367,385, now abandoned, filed on Jun. 16, 1989, which is a divisional of U.S. Ser. No. 137,066, now abandoned, filed on Dec. 23, 1987, which is a divisional of U.S. Ser. No. 897,385, filed on Aug. 18, 1986, now abandoned.

FIELD OF INVENTION

This invention relates to a method and apparatus for drawing and annealing thermoplastic tubing, particularly Teflon tubing, to precise dimensional and optical specifications. The drawn tubing has particular utility in systems which provide automatic analysis of liquid samples.

BACKGROUND OF THE INVENTION

Thermoplastic tubing has proven to be particularly useful in the automatic analysis of liquid samples. These systems selectively treat and analyze a plurality of liquid samples that are passed through the tubing in seriatim. For example, in U.S. Pat. Nos. 2,797,149 and 3,241,432, a plurality of liquid samples are introduced successively as a continuously flowing stream into an analysis apparatus, mixed with reagents and analyzed for particular constituents. The successive liquid samples in the flowing stream are separated by at least one air segment of sufficient volume to occlude the conduit along which the stream is directed. Contamination between successive liquid samples and the flowing stream is prevented by the presence of air segments, which function to maintain the successive samples discreet from one another.

Teflon ® fluoropolymer tubing has proved to be particularly useful in these devices by virtue of its highly non-wetted surface properties. When the surface of the tubing is further coated with a fluorocarbon oil, the thin oil film, together with the shear ratios between the film and the tubing wall virtually encapsulate each liquid sample and prevents the sample from ever contacting the wall of the Teflon ® fluoropolymer tubing. This technology is of particular utility in medical testing by virtue of the large number of tests to be performed on a given sample, and the sometimes limited volume of the sample to be analyzed. In the latest generation of those systems, a single microliter of a sample can be mixed with a reagent and analyzed in a discreet test.

To accurately process liquid samples of this size, to maintain the sample encapsulated within the carrier oil, and to provide a constant and ascertainable throughput for given lengths of tubing, the dimensional characteristics of commercially available Teflon ® fluoropolymer tubing must be improved by several orders of magnitude.

In addition, these automatic liquid analysis systems frequently use optical systems in the analysis step which require the tubing to be optically clear with minimum transmittance losses to avoid analysis errors and excessive recalibration each time the tubing is changed.

Commercially available medical grade clear Teflon ® fluoropolymer tubing does not possess the requisite dimensional and optical characteristics necessary for the latest generation of automatic liquid analyzers. For example, 0.5 mm tubing having the diameters of 0.020" ID and 0.034" OD, is customarily supplied with a tolerance of ±0.002", and is frequently milky or cloudy having a transmittance, in the visible range, of 75%, even though the material is technically capable of transmittance of 90 to 95%, depending upon the type of Teflon ® fluoropolymer used.

The present invention describes a method and apparatus for treating this Teflon ® fluoropolymer tubing to vastly improve its dimensional tolerances and its optical transmittance.

Objects of the Invention

It is therefore an object of the present invention to provide a method and apparatus for drawing thermoplastic tubing, particularly Teflon ® fluoropolymer tubing, to enhance its dimensional and optical characteristics.

It is a further object of the present invention to improve the concentricity of the inside and outside diameters of thermoplastic tubing, particularly Teflon ® fluoropolymer, and to eliminate ovalization, out of roundness, and variations in wall thickness.

It is a further object of the present invention to improve the optical transmittance, of commercially available medical grade Teflon ® fluoropolymer to a transmittance value as high as 90-95%.

It is further an object of the present invention to provide a method and apparatus for creating a transition tube having two different diameters in a single length of tubing, each diameter of which is concentric and uniform.

One object of the invention is to provide a method for drawing Teflon ® fluoropolymer tubing to enhance the optical and dimensional properties thereof, wherein the tubing is heated in a high temperature oil bath, and the oil bath has a temperature of at least 150° C. The tubing is then drawn through a polished diamond die, wherein the die has a drawing diameter at least 10% smaller than the diameter of the tubing. The tubing is then rapidly cooled, and annealed to at least 100° C. for at least 45 minutes to provide stress relief and a permanent set at the new diameter.

It is further an object of the present invention to provide a method for continuously redrawing Teflon ® fluoropolymer tubing, wherein a length of tubing is advanced through a high temperature oil bath and drawn through a polished diamond die with a tube gripper pulled by a variable speed motor. The diameter of the advancing tubing is then measured to generate at least one control signal, which is a function of the outside diameter of the drawn tubing. This control signal is then used to control the variable speed motor, wherein the speed of the drawing motor is slowed to increase the diameter of the tubing to a predetermined dimension or increased to reduce the diameter of the tubing to a predetermined dimension.

DETAILED DESCRIPTION OF THE PREFERRED EMBODIMENTS

Figure 1:
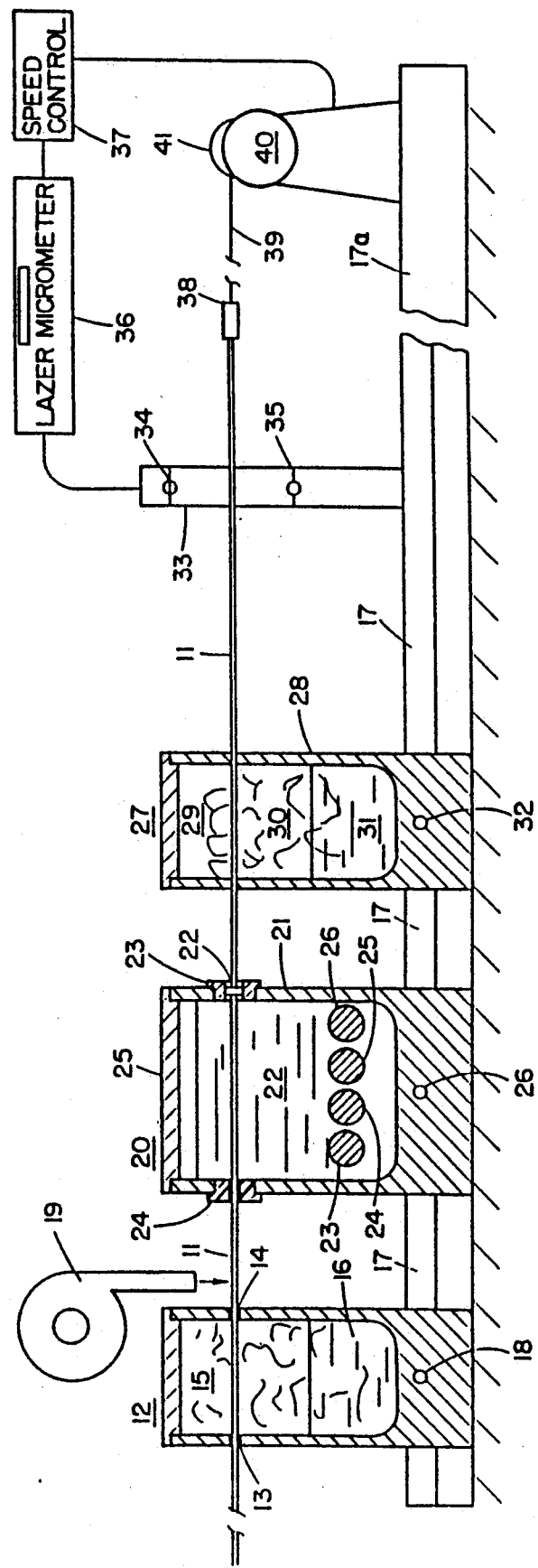
FIG. 1 is a partially cross-sectioned and diagramatic view of the apparatus used to draw lengths of straight Teflon ® fluoropolymer tubing.

FIG. 1 is a partially cross-section and diagramatic view of an apparatus for drawing thermoplastic tubing in accordance with the teachings of the present invention.

It is believed that the present invention is applicable to thermoplastic tubing, including acetals, acrylics, polyamides, polycarbonates, polyethylenes, polypropylenes ABS and PVC resins, but is of a particular benefit to the fluorocarbon resins which include Teflon ® TFE, polytetrafluoroethylene, Teflon ® FEP, a copolymer of tetrafluoroethylene and hexafluoropropylene and Teflon ® PFA, polytetrafluoroethylene with a perfluoroalkoxy side chain.

As illustrated in FIG. 1, a six foot length of Teflon ® PFA, fluoropolymer tubing 11 is being drawn to enhance its dimensional and optical properties. The first treating station 12 is a cleaning station which removes particles of dirt and other surface contaminents from the tubing. This cleaning station, in the preferred embodiment, includes an entrance port 13 and an exit port 14, and a cleaning chamber 15 filled with alcohol saturated cotton wool, and an alcohol bath 16. The wicking action of the cotton wool provides a 5 continuous renewal of the cleaning solvent at the surface of the tubing 11 as it is drawn through the cleaning station. The cleaning station 12 is adjustably mounted on an alignment rail 17 and fixed in the position illustrated in FIG. 1 by means of adjusting nut 18. As the tubing 11 exits the cleaning station, it is dried by means of static eliminator 19 that provides a flow of ionized air over the tubing to dry the alcohol and to discharge any static buildup on the tube which would attract airborne particles and negates the action of the cleaning station.

After the tubing has been cleaned, it is heated in a hot oil bath in station 20. Station 20 includes a housing member 21 filled with a fluorocarbon oil 22 which is heated with a series of electrical cartridge heaters 23-26, which in the preferred embodiment are 75 watts each, for a total of 300 watts of electrical heating.

In the preferred embodiment, 3M Fluorinet ® FC-71 fluorinated oil is used. This oil is normally used as a dielectric coolent, and has a high 250° C. boiling point. The temperature of the oil bath is nominally maintained at 200°-220° C. While higher temperatures will enable a shorter residence time in the heating bath, they also increase the danger of boiling the oil and vaporizing a potentially hazardous material into the atmosphere. Below 150° C. it has been found that there is a memory rebound in fluorocarbon tubing that will cause the tubing to return towards its initial dimensions.

It is desired in the heating step to soften the tubing through the entire thickness of the wall of the tubing without exceeding the melting point of the tubing or the boiling point of the oil. As such, the thickness of the tubing wall, the thermal conductivity of the plastic, and the boiling point of the oil must be taken into account in fixing the residence time and the temperature of the oil bath. For the purpose of this application this temperature is termed transition temperature. While 180° C.-200° C. has been found to be desirable for the fluoropolymers, the exact mechanics of the transition temperature is unknown. 180° C. to 200° C. is significantly below the melting temperatures of 280° C. for Teflon ® FEP and 300° C. for Teflon ® PFA, and far below the recommended molding extrusion temperature of 425° C. It is noted that the flexural modulas of Teflon ® fluoropolymer has dropped by a factor of 10 between 23° C. and 250° C., and it is speculated that in some way the semi-crystalline nature of the Teflon ® fluoropolymer has been altered at the transition temperature. Post process crystallization may also be involved in the enhancement of optical clarity and the annealing stress relief step.

As such, the use of a high temperature fluid bath, heated to emprically determined transitions temperatures, would be applicable to other semi-crystalline thermoplastics which include the polyolefins, acetals and thermoplastic polyesters in addition to the furoropolymers.

For the amonphous thermoplastics, such as polyvinyl chloride, polymethyl methacrylates and ABS resins, it is felt that the desired fluid bath temperature would be substantially lower and near the glass transition temperature of the plastic being drawn.

In the present invention, using Teflon ® PFA or Teflon ® PTFE tubing, a residence time of 8-16 seconds, depending upon the thickness of the tubing wall, has proved to be satisfactory. In the present invention, the oil bath 22 is approximately 3 inches in length, and a draw speed of approximately 10-25 inches per minute is used.

The draw speed also bears a functional relationship to the stress exerted on the tubing as it is pulled through the drawing die 22. In the preferred embodiment, with the above oil bath, and a die having a drawing diameter of 0.0335", a drawing speed of 22 inches per minutes has been found to be satisfactory when drawing tubing of 1 mm diameter.

The drawing die 22 is mounted in a die holder 23 which threadably engages the wall of housing 21 to secure the drawing die 22 in place. An 0 ring formed of Buna. N, a high temperature synthetic rubber may be used between the die and die holder to prevent the escape of oil from the drawing die. The entrance to the oil bath is sealed by a Teflon ® fluoropolymer bushing 24 which is pressed fitted in place, and held in place during drawing step by the frictional engagement with the Teflon ® fluoropolymer tubing 11. The housing 21 and the oil bath 22 are covered with a lid 25 to prevent the escape of vapors therefrom. The housing 21 is likewise secured to the alignment rail 17 by means of an adjustable lock nut 26.

After the tubing member 11 has been drawn to the desired diameter by means of the polished die 22, it is quickly or rapidly cooled by means of an alcohol bath in the cooling station 27. Cooling station 27 includes a housing 28 having a chamber 29 filled with cotton wool 30 and an alcohol bath 31, which provides a continual supply of alcohol to the tubing 11 by virtue of the wicking action of the cotton wool 30. The cooling station 27 cools the Teflon ® fluoropolymer tubing from approximately 200° C. to approximately 40° C. by vitue of the evaporation of alcohol from the surface of the tubing as it passes through the cooling station. The housing member 28 is likewise secured to alignment rail 17 by means of adjustment screw 32.

It has been found that rapidly cooling the tubing after it has been drawn to the desired diameter, enhances the optical characteristics of the tubing and improves the optical transmittance thereof.

After the tubing has exited cooling station 27, it is measured by means of a laser micrometer, one half of which is illustrated in FIG. 1 at 33. As noted in FIG. 6, a laser micrometer normally includes one tower on either side of the tubing to be measured, with each tower having a laser 34 and a photo sensitive diode 35 mounted thereon. The laser beams cross at the tubing to provide measurements in x and y planes of the outside diameter of the tubing. The output of the photo diode is fed to the computation and display circuitry 36, and may also be used to derive a first control signal to regulate speed control 37. The Teflon ® fluoropolymer tubing 11 is pulled through the draw box by means of a tube gripping means 38 attached to a draw wire 39 which is wound about drum 40 and turned by electric motor means 41. The electric motor means 41 is an adjustable speed motor with the speed thereof regulated by speed control means 37. As noted in FIG. 1, the alignment rail 17 is split between sections 17 and 17a to better illustrate the present invention. In actual practice, the distance between the towers 33 of the laser micrometer and the drawing drum 40 is substantially equal to the length of the tubing to be drawn to ensure that the tensile forces exerted on the tubing are linear in nature during the drawing process. In the preferred embodiment, when drawing Teflon ® fluoropolymer tubing, the diameter of the drawing drum is approximately 1 inch, and the motor means 41 rotates drum 40 at approximately 7.5 rpm. Increasing the speed of the motor, reduces the diameter of the drawn tubing, while decreasing the speed of the motor increases the diameter of the drawn tubing.

After the tubing has been drawn, it is annealed or heat treated in an oven (not illustrated in FIG. 1) for stress relaxation. In the preferred embodiment, the Teflon ® fluoropolymer tubing is heated to a temperature of 150° C. for approximately 45 minutes It has been found that the drawn Teflon ® fluoropolymer tubing may change its dimension after approximately 30 days or so unless it has been subjected to the stress relaxation step.

Figure 2:
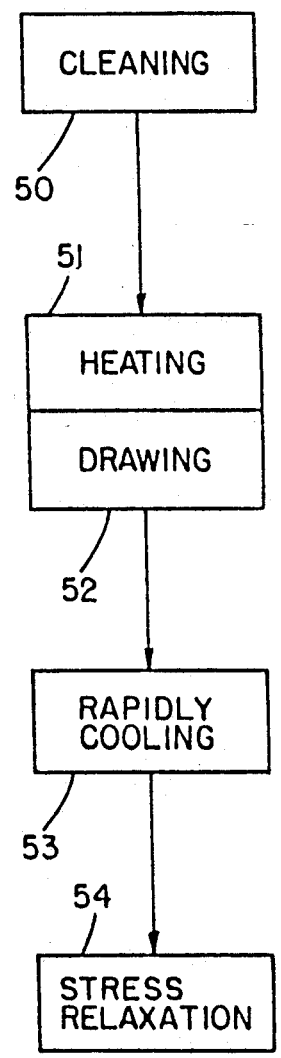
FIG. 2 is a diagramatical flowchart of the method of the present invention.

In summary, the process for drawing fluorocarbon tubing, as illustrated in FIG. 2, includes a first step 50 to remove any foreign particles from the surface of the tubing that otherwise might cause scratches or abrasions. The tube is then heated to the transition temperature, as indicated at step 51, to soften the walls of the tubing. The temperature of the oil bath is maintained between 180° C. and 220° C. with a residence time of 8-16 seconds. Following the conclusion of the heating step, the tubing is drawn through a polished diamond die in the drawing step 52. This die is nominally at least 10% smaller than the outside diameter of the tubing to be drawn. Following the conclusion of the drawing step, the tubing is rapidly cooled by an alcohol bath in step 53 to enhance its optical characteristics., The cooling normally reduces the temperature of the Teflon ® fluoropolymer tubing from approximately 200° C. to 40° C. Following the cooling step, the tubing is subjected to a second heating step 54 for annealing or stress relaxation of the tubing. In this step, the tubing is reheated to a temperature of approximately 150° C. for a period of 30-60 minutes.

Figure 3:
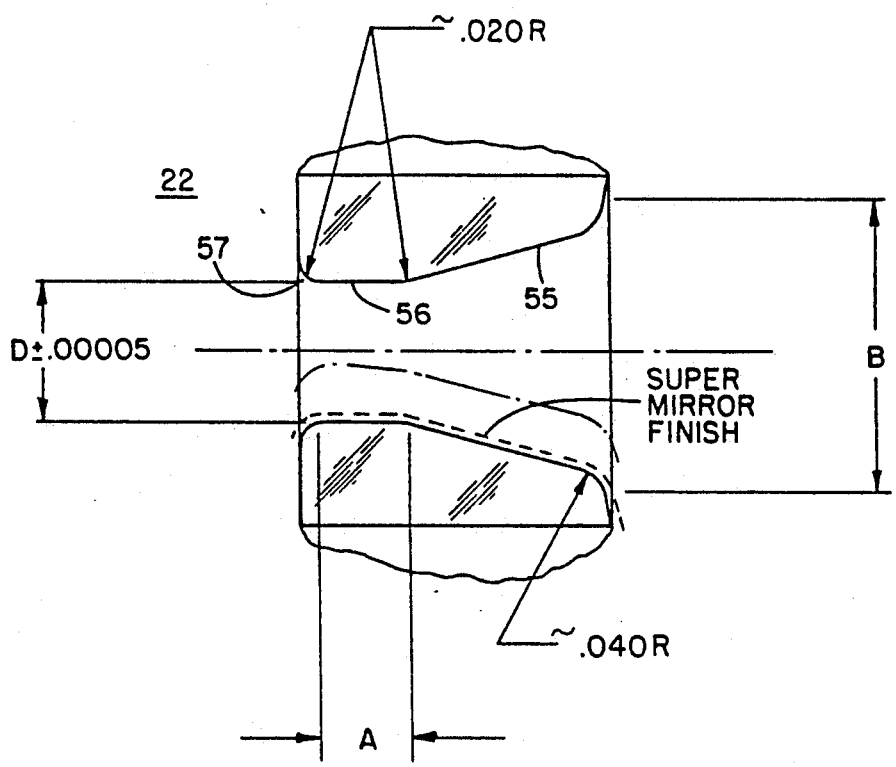
FIG. 3 is a cross-sectioned view of one of the polished diamond dies used in the present invention.

A cross-section of one of the polished diamond dies is illustrated in FIG. 3. While both synthetic ruby and stainless steel drawing dies were attempted, neither provided satisfactory results in terms of optical clarity. In the preferred embodiment, a natural diamond was used to provide the desired optical clarity. As illustrated in FIG. 3, the final drawing dimension is accurate within the tolerance of ±0.00005". Normal commercially available medical grade, clear Teflon tubing is accurate within a tolerance of 0.002. This, however, is more than twice the error that can be tolerated in the latest generation of automatic liquid analysis systems. As it will be hereinafter explained with respect to FIG. 4, an error of 0.001 will disrupt the carrier film and provide possible contamination between samples. The present invention, when used with the diamond die illustrated in FIG. 3, will provide tubing drawn to an accuracy of ±0.0002, or a factor of ten times as great as commercially available extruded tubing. As illustrated in FIG. 3, the diamond die has an entrance zone 55, a drawing zone 56 and a relaxation zone 57. The drawing dimension in zone 56 is normally selected to be approximately 10% smaller than the final outside diameter of the tubing desired. Thus, a diamond die having a 0.0335 diameter will yield Teflon ® fluoropolymer tubing of approximately 0.0380 in diameter. In practice, dies having drawing diameters of 0.0250 to 0.0950 inches have been prepared and used with success. In the design of the die, it has been found that the dimension of the drawing section 56, indicated by zone A in FIG. 3, should not be shorter than 50% of the diameter D, while diameter B should be at least two times larger than Diameter D. The transition between the entry zone 55, the drawing zone 56, and the stress relief zone 57 is radiused to a radius of 0.020 inches. The entry radius, prior to the entry zone, is radiused to 0.040 inches.

The tubing to be drawn through the die can range from 10% to 100% larger than the drawing diameter D of the die. In actual practice, a 0.045 inch tubing is drawn through a die of 0.035 to produce a 0.038 final diameter tubing. It has been found, however, that tubing diameter as large as 1.5 mm may be used to produce 1 mm tubing, while 1 mm tubing may be used to produce 0.5 mm tubing.

The benefits to be gained by using the drawn Teflon ® fluoropolymer tubing in an automatic liquid analysis system, together with a summary of the problems caused by commercially available tubing in such a system will be described with respect to FIGS. 4 and 5.

Figure 4A:
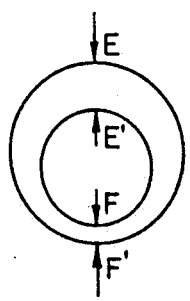
FIG. 4a is a diagramatic, representation of commercially available Teflon ® fluoropolymer tubing illustrating a variation in concentricity.
Figure 4B:
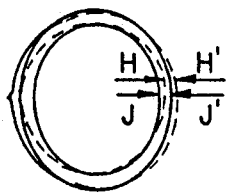
FIG. 4b is a diagramatic cross-sectional view of commercially available Teflon ® fluoropolymer tubing illustrating ovalization.
Figure 4C:
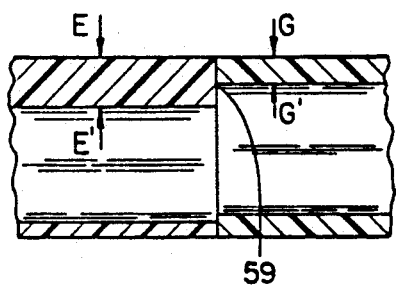
FIG. 4c is a cross-section and diagramatic view of the problems presented by non-concentricity or out of round tubing, when used in an automatic liquid analysis system.

FIG. 4a is a cross-section of a commercially available medical grade Teflon ® fluoropolymer tubing, with the scale and size of the tubing exaggerated to illustrate the problems involved As it is readily apparent from the exaggerated scale, that the dimension e—e' is substantially larger than the dimension f—f' because the tubing lacks concentricity, even though the ID and OD are relatively uniform. Concentricity in commerically available Teflon ® fluoropolymer tubing is normally supplied to meet an 80% concentric specification. While the ID and OD are supplied with in a tolerance of 0.002", a variation in concentricity of 20% can result in a 0.007 error, as illustrated in FIG. 4c. FIG. 4c is a cross-sectioned and diagramatic view of the junction point of two lengths of Teflon ® fluoropolymer wherein a nonconcentric tubing has been joined to a concentric tubing. The wall thickness of the correctly drawn tubing g—g' is approximately 0.11, wherein the wall thickness of the nonconcentric tubing e—e' could be approximately 0.018" for 1 mm tubing. The mismatch, indicated by reference numeral 59 in FIG. 4c, can be as great as 0.007". Unfortunately, a mismatch of this magnitude will destroy the thin carrier oil which protects the Teflon ® fluoropolymer tubing from the sample to be analyzed. This would allow cross contamination of the samples if such a mismatch occurred within an automatic liquid analysis machine.

The use of microliter samples require a tolerance on the order of 0.001" for successful operation. The mismatch caused by lack of concentricity illustrated in FIGS. 4a and 4c, is one example of the problems encountered in the use of conventional commercially available Teflon ® fluoropolymer tubing. FIG. 4b illustrates another example wherein ovalization of the tubing has occurred, wherein h—h' illustrates the tubing before ovalization, and j—j' illustrates the ovalized tubing. Ovalization frequently occurs when tubing is wrapped onto a spool before its elastic memory has completely set.

Still another problem that can result is variations between the desired ID and OD. A 0.001" error, over a five foot length of tubing, can result in a sample displacement of 1.7 inches, more than eight times the length of the sample itself. This magnitude of error can have grave consequences in the operation of an automatic analysis machine since each microliters sample, as it travels through a 1 mm tubing, occupies only 2/10 of an inch of linear space. This greatly complicates timing problems in correlating the arrival of the sample at the analysis station, with the definition of the sample at the input station. This is particularly a problem if two or more samples are drawn, and sent to different analysis stations for analysis. Thus, the dimensional tolerances of commercially available Teflon ® fluoropolymer tubing, even of medical grade, is not satisfactory for use in the latest generation of automatic liquid analysis machines. The present invention, however, provides accuracy for both OD and ID of ±0.0002", a ten fold improvement. In addition, concentricity rises to a virtual 100% at 100x magnification when treated in accordance with the method of the present invention.

In addition to the physical problems, the optical clarity of commerically available Teflon ® fluoropolymer tubing is not satisfactory for use in these machines. While Teflon ® fluoropolymer tubing is theoretically capable of transmittance of 90-95%, tubing is frequently on the order of 75 to 80%, and may be scratched, or milky rather than clear. It is known that the use of stainless steel extrusion dies will result in fine scratch marks on the tubing as the crystal structure of the stainless steel abrades the tubing. This degrades the optical clarity of the tubing. It is believed that the milky appearance of some tubing is due to the incomplete homogenization of the Teflon powder used to extrude the tubing. It has been found that the oil bath, the diamond die, and the rapid cooling of the tubing result in substantially improved optical qualities, approaching the theoretical maximum of the Teflon ® fluoropolymer.

Figure 5A:
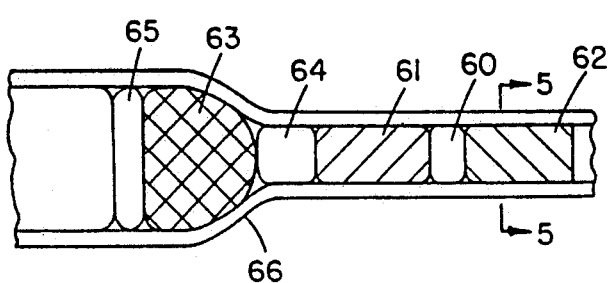
FIG. 5a is a diagramatic cross-sectional view of a transition tubing used in automatic liquid analysis systems
Figure 5B:
FIG. 5b is a diagramatic and cross-sectioned view of the tubing illustrated in FIG. 5a, taken along section line 5—5', when prepared in accordance with the present invention.

The present invention provides still another advantage with respect to conventional extruding and drawing techniques. FIG. 5a illustrates the "vanish zone" used in the latest generation of automatic liquid analyzers. In this zone, small immiscible air bubbles 60, that separate sample 61 and reagent 62 vanish, and allow the sample to be mixed with the reagent as indicated by the mixed sample 63. Also used in these systems, larger immiscible air bubbles indicated at 64 and 65 are used to separate the different samples for testing. When the serial progression of samples and reagents reaches the vanish zone 66, the smaller immiscible bubbles 60 become merged with the larger separating bubbles 64 and allow the sample and the reagent 61,62 to combine for a reaction.

Figure 5C:
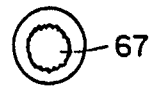
FIG. 5c is a diagramatic and cross-sectioned view of a transition tubing taken along section line 5—5', illustrated in FIG. 5a, when the tubing is drawn with conventional prior art drawing techniques.

Attempts to create this "vanish zone" with conventional Teflon ® fluoropolymer tubing, and conventional drawing and extruding techniques resulted in tubing having the cross-sectional configuration illustrated in FIG. 5c, wherein FIG. 5c represents a section taken along section line 5—5' of FIG. 5a. In conventional cold drawing techniques, the Teflon was reduced in diameter, but it resulted in substantial crinkling of the inner walls of the tubing, with the ridges and valleys noted at 67 exceeding 0.001 inches in size. This destroyed the integrity of the oil film surrounding the samples and reagents, and would lead to cross contamination of samples. By treating the tubing in accordance with the method described in the present invention, the cross-sectional configuration illustrated in 5b resulted, with no inner crinkling of the drawn tubing. To form the tubing illustrated in FIG. 5a, a 1.5 mm tubing is first drawn completely through the apparatus illustrated in FIG. 1 to provide precise dimensional tolerances for the entire length of tubing. Following the stress relaxation step, the set of dies for 1 mm tubing are installed in the apparatus, and the tubing is advanced part way through the drawing die. When the desired transition point has reached the drawing die 22, illustrated in FIG. 1, the motor means 41 is reversed, and the tubing is withdrawn from the apparatus. This step creates a tube with first and second diameters with a transition zone therebetween. This tubing may then be reinserted in the opposite direction to draw the other end of the tubing to the desired diameter along a predefined portion of its length. This will create a tubing having a first diameter at either end of the tubing, with an enlarged portion therebetween, formed between two transition points. This enlarged portion can then be used as the vanish zone for automatic analysis of liquid samples.

Figure 6:
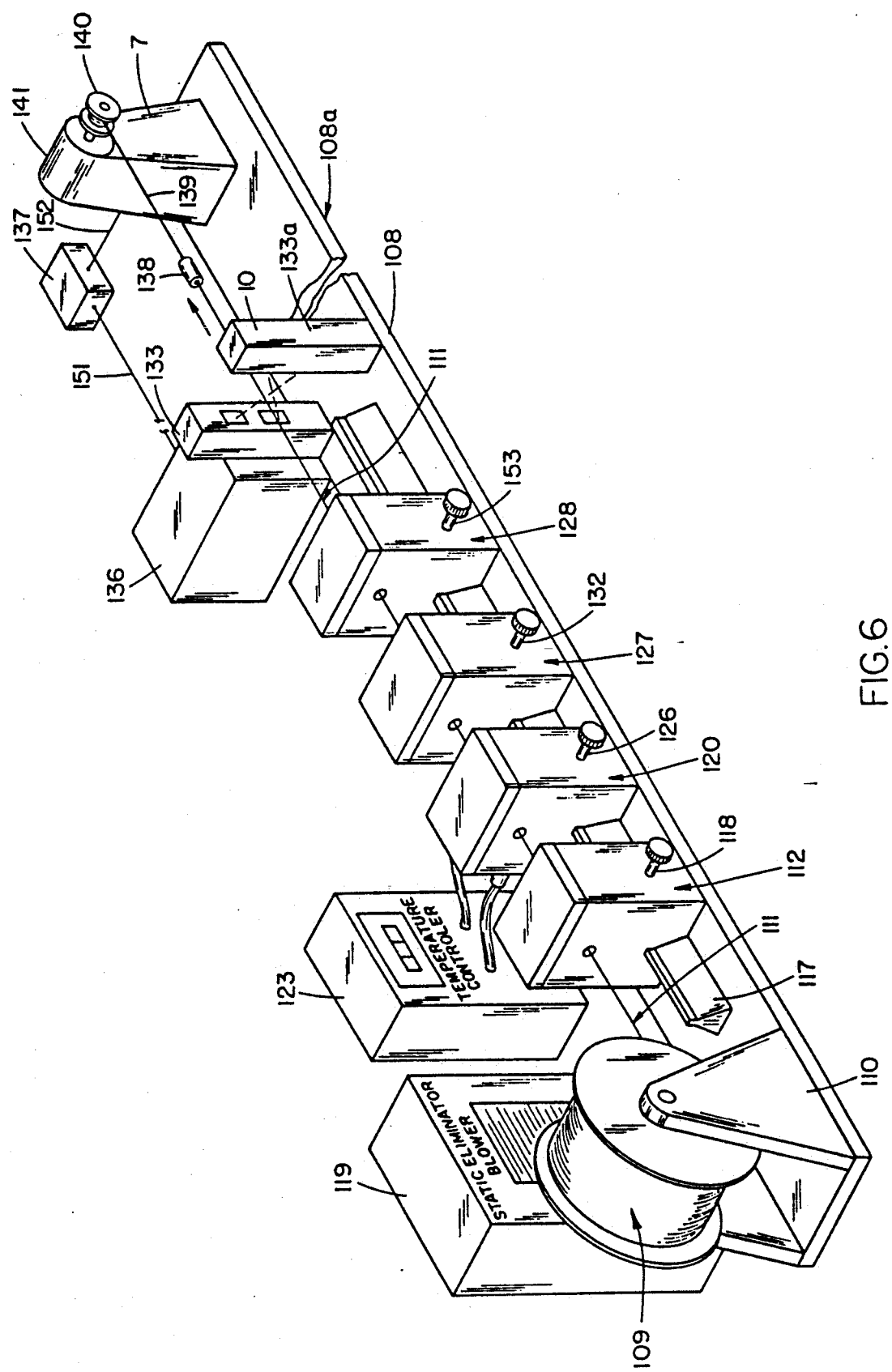
FIG. 6 is a diagramatic view of an alternate embodiment of the present invention, particularly adapted for a continuous drawing of a spool of thermoplastic tubing.

FIG. 6 illustrates still another embodiment of the present invention particularly adapted for rapid continuous processing of thermoplastic tubing. A spool of conventionally extruded thermoplastic tubing 109 has been mounted on a free wheeling spool support 110. The tubing 111 is drawn from the spool 109 and passes through a first cleaning station 112. Simultaneously, an electrostatic blower 119, for eliminating static electricity, is discharging a stream of ionized air on either side of the cleaning station 112. From cleaning station 112, the tubing then passes through a heated draw box 120 having an internal oil bath (not illustrated in FIG. 6) which is heated to a predetermined temperature by temperature controller 123. The outlet side of the draw box 120 contains a diamond die similar to that illustrated in FIG. 3 for drawing the tubing 111 to a precise dimensional tolerance. After exiting the drawing die, the tubing passes to cooling station 127 where it is rapidly cooled to room temperature by means of a liquid bath. Following the rapid cooling step, the tube is reheated in a stress relief zone 128 and measured by a laser micrometer 136 having first 133 and second, 133a laser towers. Each of the towers contains a laser beam and a photo diode assembly for measuring the tubing 111 in both the x and y planes. The tubing is pulled through the apparatus illustrated in FIG. 6 by means of a tube gripper 138 attached to a draw wire 139 which is wound around a pulling spool 140 and rotated by a variable speed motor 141. The laser micrometer 136 may also generate a first control signal which is sent the speed controller 137 by means of circuit 151. The speed of motor 141 is then controlled by speed controller 137 over circuit 152. The entire apparatus is aligned along alignment rail 117 with each station fixed in position by means of adjusting screws 118, 126, 132, and 153.

It should be noted that the stress relief box 128, illustrated in FIG. 6, could provide the desired stress relief temperature of 150° C. by virtue of an oil bath similar to that illustrated by oil bath 22 in FIG. 1. While this may be sufficient for, some, thermoplastic tubing, it has been found that Teflon ® fluoropolymer tubing needs a longer residence time, on the order of 30 to 60 minutes to prevent elastic rebound of the Teflon ® fluoropolymer its prior configuration. While the redrawn tubing could be wrapped around the drawing spool, if appropriate corrections were made in the drawing speed as a function of the spool diameter, in the preferred embodiment of the invention, it has been found desirable to draw a specific length of tubing for the desired application, and then sever the tubing at the laser micrometer. The variable speed motor is then reversed, and the tube gripper is returned to the laser micrometer to advance a second length of tubing through the drawing apparatus. In this connection, it should be noted that base members 108 and 108a have been separated to indicate that the two devices should be spaced the desired distance of the tubing to be drawn.

While only certain preferred embodiments of this invention have been describe, it is understood that many variations are possible without departing from the scope of this invention, as defined in the claims which follow.

I claim:

1. An extruded and redrawn fluoropolymer tube having an outer diameter of 0.25 to 2.5 mm, and a dimensional accuracy throughout its length of ±0.0002 inches.

2. An extruded and redrawn fluoropolymer tube as claimed in claim 1 having a uniform concentricity of inner and outer diameters and optical transmittance in excess of 90%.

* * * * *

UNITED STATES PATENT AND TRADEMARK OFFICE
CERTIFICATE OF CORRECTION

PATENT NO. : 5,246,752
DATED : September 21, 1993
INVENTOR(S) : Jan Raczkuwski

It is certified that error appears in the above-indentified patent and that said Letters Patent is hereby corrected as shown below:

On the Title Page Section [56], line 10: "3,668,166" should read --3,668,916-- and Column 2, line 2: "4,378,904" should read --4,378,690--

Column 2, line 24: after "fluoropolymer" insert --tubing--

Column 3, line 47: delete "5"

Column 4, line 35: "furoropolymers" should read --fluoropolymers--

Column 5, line 11: delete "."

Column 7, line 9: after "fluoropolymer" insert --tubing--

Signed and Sealed this

Twenty-fourth Day of May, 1994

Attest:

BRUCE LEHMAN

*Attesting Officer*   *Commissioner of Patents and Trademarks*